Patented Oct. 3, 1922.                                                  1,430,746

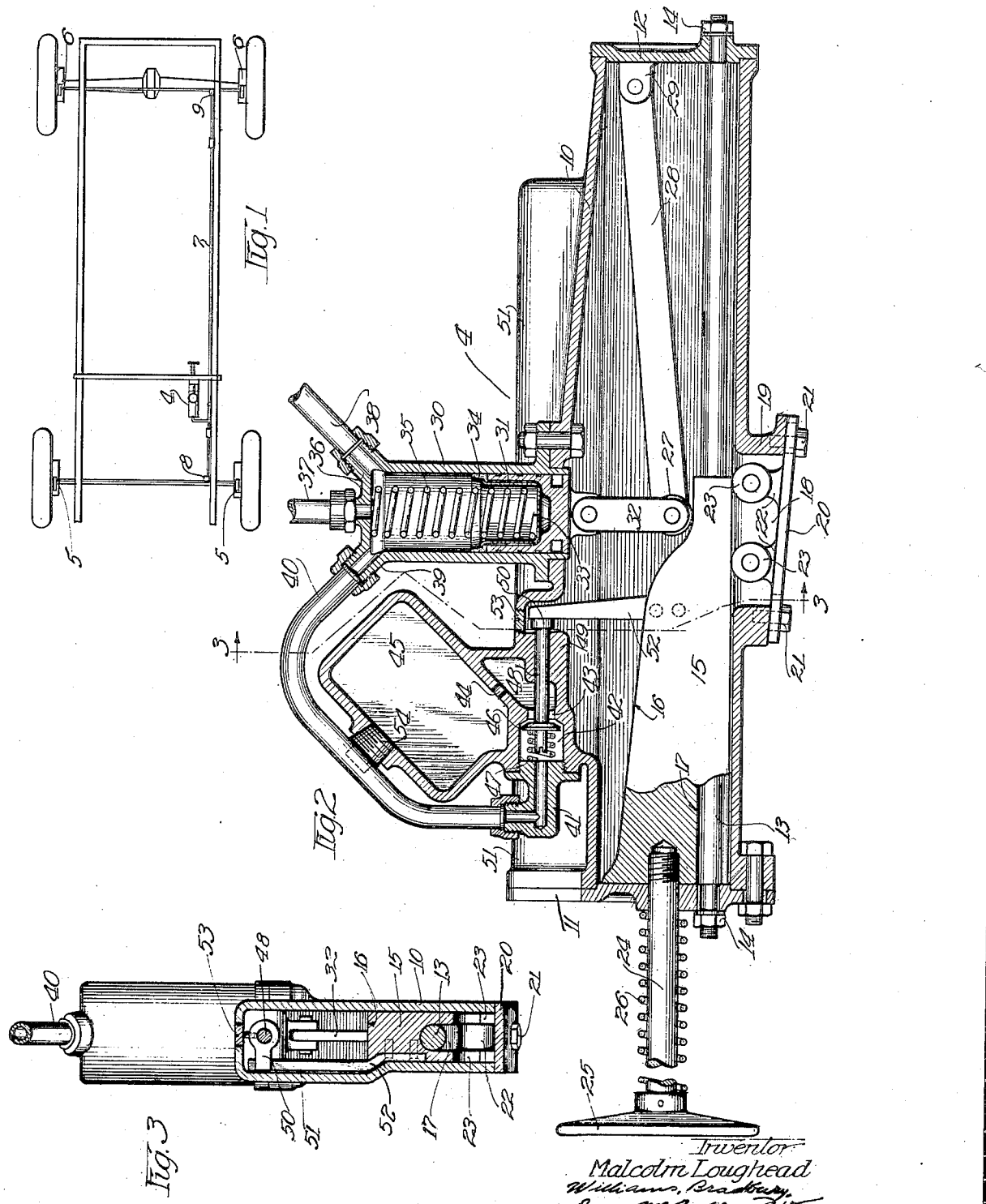

UNITED STATES PATENT OFFICE.

MALCOLM LOUGHEAD, OF DETROIT, MICHIGAN, ASSIGNOR TO FOUR WHEEL HYDRAULIC BRAKE COMPANY, OF LOS ANGELES, CALIFORNIA, A CORPORATION OF CALIFORNIA.

BRAKING APPARATUS.

Application filed December 17, 1920. Serial No. 431,333.

*To all whom it may concern:*

Be it known that I, MALCOLM LOUGHEAD, a citizen of the United States, and resident of Detroit, in the county of Wayne and State of Michigan, have invented a certain new and useful Improvement in Braking Apparatus, of which the following is a full, clear, concise, and exact description, reference being had to the accompanying drawings, forming a part of this specification.

My invention relates to braking apparatus of the fluid-operated type adapted for use on automobiles and similar vehicles, and is concerned particularly with improvements in a pedal-operated fluid compression device for producing pressure upon the fluid in the braking system to operate the braking mechanisms.

The principal object of the invention is to provide a foot operated fluid pressure producing mechanism in which the ratio of pedal movement to fluid flow is changed at an intermediate point in the pedal movement so as to produce a greater fluid pressure without a proportionately greater foot pressure.

Another object of the present invention consists in the provision of a novel form of compression device of the character described whereby, in operation, production of suction in the system is prevented, thereby precluding any possible formation of air bubbles in the system which are very troublesome in systems of this type and which impair the effectiveness of the braking mechanisms generally.

Still another object of this invention resides in the provision of a fluid reservoir in conjunction with the compression device, which contains at all times a reserve supply of fluid to compensate for loss due to leakage, evaporation, etc., thereby insuring that a constant supply of operating fluid is maintained in the system.

The above and other objects of my invention will appear in the following detailed description, in which reference is made to the accompanying drawing, wherein Figure 1 is a skeleton plan of a braking system of the character described, applied to an automobile and in connection with which my present invention is particularly adapted to operate;

Figure 2 is a central longitudinal vertical section of the compression device, the various elements of which are illustrated in their respective normal inoperative positions; and Figure 3 is a cross section taken on line 3—3 of Figure 2, looking in the direction indicated by the arrows.

The same reference numerals represent the same parts in the several views.

Referring to the drawing, the reference numeral 4 designates the compression device of my invention which, as seen in Figure 1, is operatively connected with the braking mechanisms 5—5 on the front wheels and other similar mechanisms 6—6 on the rear wheels. The compressor 4 is joined with these various mechanisms through a fluid-pressure system, as illustrated, which may conveniently comprise a pipe 7 running the length of the chassis and joined, as at 8 and 9, through suitable connections with the branches at the front and rear of the automobile, which branches, as illustrated, communicate with the aforesaid braking mechanisms.

The braking mechanisms which are diagrammatically represented may be of any suitable form, but are preferably of that type described and claimed in my co-pending application, Serial Number 431,332, filed of even date herewith, and further although the connections 8 and 9 may be of any convenient form, I prefer to utilize at these points connections similar to those described and claimed in my co-pending application, Serial Number 431,335, likewise filed of even date herewith, which connections compensate for the relative movement of the automobile axles and the chassis.

Referring now particularly to Figures 2 and 3, it will be seen that my compression device comprises a housing 10, generally rectangular in cross section, as illustrated in Figure 3, and is provided with suitable end plates 11 and 12, bolted or otherwise secured thereto.

Extending the length of the housing 10 and mounted in the end plates 11 and 12 is a guide rod 13 secured to the end plates at its reduced ends by means of nuts 14—14. A cam block 15 having the cam face 16 has a guideway 17 formed in its lower edge to receive the guide rod 13. Provided in the bottom wall of the housing 10 is an opening 18 surrounded by a housing 19, the lower edge of which is cut on an incline to the axis of the guide rod 13, as shown, and receives a plate 20 secured by means of bolts 21, which pass through slots in the plate by means of which the plate is longitudinally adjustable on the housing 19. Provided on the plate 20 are bearing blocks 22—22, in which are mounted pairs of rollers 23—23, which engage the lower edge of the cam block 15 to support the same. To facilitate adjustment and compensate for wear, the plate 20 is made movable longitudinally along the inclined surface of the walls 19.

A rod 24 is threaded into the block 15 and passes through a suitable opening in the end plate 11 and carries at its outer free end a suitable foot pedal 25. The rod 24 passes through a compression spring 26, which is disposed between the pedal 25 and the end plate 11, serving to urge the cam block 15 normally outwardly from the cam follower roller 27, which is carried upon the free end of an arm 28 pivotally secured to a lug 29 carried by the end plate 12.

Bolted or otherwise secured upon the housing 10 is a compressor cylinder 30 in which is movable a piston 31 pivotally connected upon the free end of arm 28 adjacent the roller 27 by means of a link 32. The piston 31, it will be noted, is inverted and receives a sheet metal cup 33, the upper edge of which is flared outwardly to engage an upwardly facing cup leather 34 mounted upon the upper edge of the skirt of the piston 31 and serving to prevent passage of fluid under pressure past the packing rings mounted in the skirt of the piston 31. A compression spring 35 acting between the head of cylinder 30 and the cup 33 holds the latter in place and urges the piston 31 normally downwardly. Communicating with the cylinder 30 at the head thereof are the two branches 36—36, which receive pipes 37 and 38, which in turn establish communication between the compressor cylinder 30 and the several pressure-operated braking mechanism above referred to.

A third branch 39 extending from the head of the cylinder 30 receives a pipe 40 which extends outwardly and downwardly and which is suitably connected at its free end to an elbow 41, which is screwed into a small chamber 42 provided in the upper wall of the housing 10, as shown. Communicating with the chamber 42 by means of the ports 43 and 44 is a fluid reservoir 45, which, it will be noted, is formed integral with the upper wall of housing 10 and extends at an angle of substantially 45° thereto, for a purpose presently to appear.

A valve 46 in the chamber 42 is adapted to control the passage of fluid from the reservoir 45 through the port 43, being urged normally to its seat by a rather weak spring 47. The valve 46 is provided with a stem 48, which passes through a web 49 provided in the upper wall of the housing 10 back of the chamber 42. The web 49, in which the stem 48 has a close fit, is rather thick to prevent passage of fluid along the valve stem. Suitable packing material may be provided at this point if desired. Secured upon the inner end of the valve stem 48 is a tappet 50, the outer free end of which extends transversely into a passageway 51, provided in the housing 10. A push-finger 52 secured upon the side of the cam block 15 extends upwardly at right angles thereto and travels in the passageway 51 provided therefor. At the inner end of the stroke of the cam block the push-finger 52 is arranged to engage the tappet 50 to unseat the valve 46 to open the port 43 to thereby establish communication between the reservoir 45 and the cylinder 30 and the system through the pipe 40. A suitable plug 53 may be provided for a fingerhole above the inner end of the stem 48, whereby application and adjustment of the tappet 50 on the end of the stem 48 may be effected. A filling plug 54 is provided for the fluid reservoir 45.

In normal operation the rod 24 projects through a suitable hole in the toe board of the automobile, so that the pedal 25 lies a substantial distance above the toe board to be operable by the operator's foot. A suitable bracket may be provided whereby the compression device, as a whole, is supported, preferably from the nether side of the aforesaid toe board, the device occupying a position preferably at right angles to the toe board and at an angle of about 45° to the floor, the reservoir 45 being then in substantially a horizontal position.

The housing 10 may be partially filled with lubricant when the compression device is assembled to avoid the necessity of replenishing the supply at short intervals. The system is filled with the operating fluid which is preferably a non-compressible liquid as oil or alcohol. In filling the system the plug 54 is removed and the fluid introduced, preferably under a light pressure of say 3 or 4 pounds, to overcome the pipe friction, and in order to force out the air in the system through a plurality of air vent valves which may be provided for this purpose. When the system is completely filled with the operating fluid, the air vent valves are closed and the plug 54 is replaced, whereupon the system is in operating condition.

The operation of the device is as follows: Initial depression of the pedal 25 moves the cam block 15 inwardly on the guide rod 13, thereby causing the finger 52 to release the valve 46 which seats immediately and closes the port 43 under action of the spring 47. Communication between the reservoir 45 and the cylinder 30 is thereby broken. Further depression of the pedal causes the piston 31 to move upwardly, due to its connection with the follower roller 27 which rides upon the cam face 16. The piston traveling upwardly in the cylinder compresses the fluid therein, the pressure being communicated through the pipes 37 and 38 to the pressure-responsive means of the aforesaid brake operating mechanisms. By the time the follower roller 27 arrives at the point of sudden change in slope on the cam face 16, substantially all of the slack has been taken up in the brake bands. It will be noted that the movement upwardly of the roller 27, up to this point, is very rapid, due to the abrupt curvature of the cam face 16 toward this point. The remainder of the cam face has a very gradual rise, as shown, whereby a very high pressure may be produced in the system to operate the brakes by a comparatively light pressure exerted upon the pedal 25. After the pedal 25 has been sufficiently depressed to stop the automobile or to properly impede its movement, the operator releases the brakes by simply removing his foot from the pedal 25. The spring means provided at 26 and 35 insure a quick and easy return of the parts to their normal inoperative positions. As the cam block 15 returns to its normal inoperative position, in which it is illustrated in Figure 2, the cam follower roller 27 riding upon the cam face 16 permits the piston 31 to recede from the head of the cylinder 30 to permit the return of the fluid from the system through the pipes 37 and 38. The piston 31 is returned under the direct action of the spring 35 and indirectly too by the spring 26. Friction in the walls of the pipes and in the operating parts might hinder the fluid from returning from the system at as great a rate as the piston 31 makes displacement therefor; a suction would thereby be formed in the system. This initial suction opens the valve 46 against action of the weak spring 47 whereby fluid from the reservoir 45 is caused to flow to the system to compensate for the sluggish fluid movement, and the suction is practically immediately relieved. When the cam block arrives at the outer end of its stroke the finger 52 engages the tappet 50, thereby holding the valve 46 open. Further return flow of fluid from the system may cause a return of some fluid to the reservoir, the valve thereby maintaining a constant fluid supply in the system.

In the foregoing description I have made use of such terms as "upper" and "lower", "inner" and "outer", etc., which it must be understood are used merely in their relative sense and not in their specific sense.

While I have described the details of the preferred embodiment of my invention, I do not limit myself to these details of construction, but claim further all adaptations and modifications coming within the spirit and scope of the appended claims.

What I claim is:

1. In a fluid pressure braking mechanism, the combination with a cylinder, of a piston operating therein for producing pressure upon the fluid of the system, a foot-operated member for causing the movement of said piston, a mechanism connecting the foot operated member with the piston, such mechanism comprising means for moving the piston a greater distance during certain units of movement of the foot-operated member than during other units of movement of the foot-operated member, and for causing an abrupt change from one rate of movement to another.

2. A pressure producing mechanism for fluid-operated vehicle brakes, comprising in combination a foot-operated cam, a follower engaging said cam, a piston operated by said follower, said cam having a more abrupt grade upon which said follower rides during the first part of its movement than that upon which said follower rides during the latter part of its movement whereby the ratio of foot movement to piston movement is varied.

3. A fluid pressure producing mechanism for fluid operated vehicle brakes comprising a longitudinally movable operating member and means for translating the movement of said member into fluid movement under pressure, said means providing a greater fluid movement for the initial movement of said operating member than for a similar later movement of said foot-operated member.

4. A pressure producing mechanism for fluid operated vehicle brakes comprising means to translate mechanical movement into fluid movement, said means providing an abrupt change of ratio between mechanical and fluid movement whereby a greater fluid movement may be obtained for the first units of mechanical movement than is obtained in the same number of units of mechanical movement at a later part of the stroke of the mechanical movement.

5. In a braking apparatus, a compression device including a cylinder and a piston movable therein, a manually operated means, and a connection between said manually operated means and said piston arranged to cause a relatively large movement of said piston during the initial movement of said manually operated means, and an abrupt change to a relatively small movement of said piston during a subsequent movement of said manually operated means.

6. In a compression device, a cylinder, a piston movable therein, an actuating means for said piston, a link extending between said actuating means and said piston, a fixed abutment, and a second link joining said first link to said abutment.

7. In a compression device, a cylinder, piston movable in said cylinder, a reciprocable cam, a cam follower for engaging said cam, a connection between said follower and said piston, and means for preventing movement of said follower in the direction of movement of said cam.

8. In a compression device, a cylinder, a piston movable in said cylinder, a cam, a cam follower for engaging said cam, a link connecting said follower to said piston, a fixed abutment, and a second link joining said follower to said abutment.

9. In a compression device, a cylinder, a piston movable therein, a reciprocable cam block, a cam follower for said cam block, and a link joining said follower and said piston, said cam block being so conformed as upon initial operation of the same to cause a sudden relatively large movement of said piston and thereafter to cause a comparatively slow, gradual movement of said piston.

10. In a compression device, a cylinder having communication with a fluid pressure system, a piston movable in said cylinder, means for operating said piston comprising a reciprocable cam block, manual means arranged to operate said block, a cam follower for said cam block, and a link joining said follower to said piston, said cam block being so conformed as upon initial operation of the same to cause a relatively large movement of said piston to force a large volume of fluid into said system under low pressure, and thereafter to cause a comparatively slow, gradual movement of said piston to force a comparatively small volume of fluid into said system under a relatively high pressure.

11. In a compression device, a cylinder, a piston movable therein, a reciprocable cam block, manual means for operating said cam block, a cam follower for said cam block, a link joining said follower to said piston, a fixed abutment, and a link joining said follower to said fixed abutment, said cam block being so conformed as upon initial movement thereof to cause a relatively large movement of said piston to force a large volume of fluid into said system under low pressure, and thereafter to cause a comparatively slow movement of said piston to force a relatively small volume of fluid into said system under a relatively high pressure.

12. A compression device of the character described comprising a cylinder having communication with a fluid-pressure system, a piston movable in said cylinder, means for operating said piston comprising a reciprocable cam block, a foot pedal adapted to operate the same, a cam follower roller for said cam block, and a link joining said roller and said piston to communicate movement to the latter, said cam block being so conformed as upon initial operation of the same to cause a sudden great movement of said piston to force a large volume of fluid into said system under a low pressure, and thereafter to cause a comparatively slow gradual movement of said piston to force a comparatively small volume of fluid into said system under a comparatively high pressure, a fluid reservoir adapted to have communication with said system and said cylinder, and means for controlling said communication comprising a valve, a tappet for said valve, and means for engaging said tappet to open and close said valve, comprising a push finger carried by said cam block and arranged to operate said tappet when said block lies adjacent its normal inoperative position.

13. A compression device of the character described comprising a cylinder having communication with a fluid-pressure system, a piston movable in said cylinder, means for operating said piston comprising a reciprocable cam block, a foot pedal adapted to operate the same, a cam follower roller for said cam block, and a link joining said roller and said piston to communicate movement to the latter, said cam block being so conformed as upon initial operation of the same to cause a sudden great movement of said piston to force a large volume of fluid into said system under a low pressure, and thereafter to cause a comparatively slow gradual movement of said piston to force a comparatively small volume of fluid into said system under a comparatively high pressure, a fluid reservoir adapted to have communication with said system and said cylinder, and means for controlling said communication comprising a valve, a tappet for said valve, and means for engaging said tappet to open and close said valve.

14. A compression device of the character described comprising a cylinder having communication with a fluid-pressure system, a piston movable in said cylinder, means for operating said piston comprising a reciprocable cam block, a foot pedal adapted to operate the same, a cam follower roller for said cam block, and a link joining said roller and said piston to communicate movement to the latter, said cam block being so conformed as upon initial operation of the same to cause a sudden great movement of said piston to force a large volume of fluid into said system under a low pressure, and thereafter to cause a comparatively slow gradual movement of said piston to force a comparatively small volume of fluid into said system under a comparatively high pressure, a fluid reservoir adapted to have communication with said system and said cylinder, and means for controlling said communication.

15. A compression device of the character described comprising a cylinder having communication with a fluid-pressure system, a piston movable in said cylinder, means for operating said piston comprising a reciprocable cam block, a foot pedal adapted to operate the same, a cam follower roller for said cam block, and a link joining said roller and said piston to communicate movement to the latter, said cam block being so conformed as to cause a sudden great movement of said piston to force a large volume of fluid into said system, and thereafter to cause a comparatively slow gradual movement of said piston to force a comparatively small volume of fluid into said system, a fluid reservoir adapted to have communication with said system and said cylinder, and means for controlling said communication.

16. A compression device of the character described comprising a cylinder having communication with a fluid-pressure system, a piston movable in said cylinder, means for operating said piston comprising a reciprocable cam block, a foot pedal adapted to operate the same, a cam follower roller for said cam block, and a link joining said roller and said piston to communicate movement to the latter, a fluid reservoir adapted to have communication with said system and said cylinder, and means for controlling said communication.

In witness whereof, I hereunto subscribe my name this 13" day of December, 1920.

MALCOLM LOUGHEAD.

Witnesses:
 I. O. BURTON,
 H. MOFFET.